United States Patent
Howells et al.

(10) Patent No.: US 11,280,686 B2
(45) Date of Patent: Mar. 22, 2022

(54) TEMPERATURE MEASUREMENT USING ETALONS

(71) Applicant: Applied Materials, Inc., Santa Clara, CA (US)

(72) Inventors: Samuel C. Howells, Portland, OR (US); Bruce E. Adams, Portland, OR (US)

(73) Assignee: Applied Materials, Inc., Santa Clara, CA (US)

( * ) Notice: Subject to any disclaimer, the term of this patent is extended or adjusted under 35 U.S.C. 154(b) by 348 days.

(21) Appl. No.: 16/513,842

(22) Filed: Jul. 17, 2019

(65) Prior Publication Data

US 2020/0025631 A1   Jan. 23, 2020

Related U.S. Application Data

(60) Provisional application No. 62/700,644, filed on Jul. 19, 2018.

(51) Int. Cl.
    G01K 11/00    (2006.01)
(52) U.S. Cl.
    CPC ................................. G01K 11/00 (2013.01)
(58) Field of Classification Search
    USPC ....... 374/161, E11.017; 365/35.5; 250/341.3
    See application file for complete search history.

(56) References Cited

U.S. PATENT DOCUMENTS

| 5,263,776 A * | 11/1993 | Abraham | G01K 11/00 356/45 |
| 5,682,236 A * | 10/1997 | Trolinger | G01B 11/164 356/28.5 |
| 9,441,948 B2 * | 9/2016 | Vakoc | G01B 9/02072 |
| 2001/0026357 A1 * | 10/2001 | Ota | G03F 9/7049 355/53 |
| 2006/0061768 A1 * | 3/2006 | Duplain | G01B 9/02028 356/479 |
| 2007/0092177 A1 * | 4/2007 | Nilsson | H01S 5/0265 385/14 |
| 2012/0022360 A1 * | 1/2012 | Kemp | A61B 5/417 600/410 |

(Continued)

*Primary Examiner* — Lisa M Caputo
*Assistant Examiner* — Nasir U. Ahmed
(74) *Attorney, Agent, or Firm* — Patterson + Sheridan, LLP

(57) ABSTRACT

A method includes exposing a sample etalon-object to sample incident radiation, resulting in a sample transmitted radiation and sample reflected radiation; exposing a reference etalon-object to reference incident radiation, resulting in a reference transmitted radiation and reference reflected radiation; and analyzing resultant radiation for a heterodyned spectrum. The sample transmitted radiation may become the reference incident radiation, and the reference transmitted radiation may become the resultant radiation. The reference transmitted radiation may become the sample incident radiation, and the sample transmitted radiation may become the resultant radiation. The sample transmitted radiation may become the reference incident radiation, and the reference reflected radiation may become the resultant radiation. The reference transmitted radiation may become the sample incident radiation, and the sample reflected radiation may become the resultant radiation.

19 Claims, 7 Drawing Sheets

(56) References Cited

U.S. PATENT DOCUMENTS

| | | | |
|---|---|---|---|
| 2012/0084045 A1* | 4/2012 | Koshimizu | G01B 9/02021 702/134 |
| 2013/0264316 A1 | 10/2013 | Li et al. | |
| 2013/0314713 A1* | 11/2013 | Nagai | G01B 11/06 356/451 |
| 2015/0221535 A1* | 8/2015 | Nguyen | H01L 21/67248 374/161 |
| 2017/0045689 A1* | 2/2017 | Zhang | G02F 1/025 |

* cited by examiner

TEMPERATURE MEASUREMENT USING ETALONS

CROSS REFERENCE TO RELATED APPLICATIONS

This application claims benefit of U.S. Provisional Patent Application Ser. No. 62/700,644, filed Jul. 19, 2018, entitled "Temperature Measurement Using Etalons," which is incorporated herein by reference.

BACKGROUND

Field

Embodiments of the present disclosure generally relate to temperature measurements in semiconductor processing chambers, and specifically to non-contact temperature measurements by heterodyning coherent radiation between two etalon-objects within or associated with the processing chamber.

Description of the Related Art

Temperature is a key parameter for semiconductor processing. Measurement of temperature of selected objects at various locations in a processing chamber and at various processing stages can be challenging. For example, temperature measurement of in situ semiconductor substrates offers significant challenges for traditional measurement technologies.

Current pyrometers estimate temperature by detecting thermal radiation. However, although current pyrometers may avoid surface-contact risks, pyrometers may be limited to high temperatures (e.g., >380° C.). The accuracy of current pyrometers may be limited due to emissivity variability (e.g., emissivity variability of surface patterns). Many new low temperature processes with complex film stacks are beyond the limits of accurate and repeatable radiation pyrometers.

Although the shift in optical transmission at the band-gap of silicon has been employed for low temperature regions, shift measurements may be limited in temperature ranges. Additionally, indirect temperature measurements are separately calibrated from the higher-temperature pyrometers. Maintaining accurate calibration across both low and high temperature ranges can be challenging.

Therefore, there is a need in the art for improved methods and systems for temperature measurement.

SUMMARY

In one or more embodiments disclosed herein, a method includes exposing a sample etalon-object to a sample incident radiation, resulting in a sample transmitted radiation, wherein the sample etalon-object is disposed in a processing chamber; exposing a reference etalon-object to a reference incident radiation, resulting in a reference transmitted radiation; and analyzing a resultant radiation for a heterodyned spectrum, wherein the sample transmitted radiation becomes the reference incident radiation, and the reference transmitted radiation becomes the resultant radiation.

In one or more embodiments disclosed herein, a method includes exposing a sample etalon-object to a sample incident radiation, resulting in a sample transmitted radiation, wherein the sample etalon-object is disposed in a processing chamber; exposing a reference etalon-object to a reference incident radiation, resulting in a reference transmitted radiation; and analyzing a resultant radiation for a heterodyned spectrum, wherein the reference transmitted radiation becomes the sample incident radiation, and the sample transmitted radiation becomes the resultant radiation.

In one or more embodiments disclosed herein, a method includes exposing a sample etalon-object to a sample incident radiation, resulting in a sample transmitted radiation, wherein the sample etalon-object is disposed in a processing chamber; exposing a reference etalon-object to a reference incident radiation, resulting in a reference reflected radiation; and analyzing a resultant radiation for a heterodyned spectrum, wherein the sample transmitted radiation becomes the reference incident radiation, and the reference reflected radiation becomes the resultant radiation.

In one or more embodiments disclosed herein, a method includes exposing a sample etalon-object to a sample incident radiation, resulting in a sample reflected radiation, wherein the sample etalon-object is disposed in a processing chamber; exposing a reference etalon-object to a reference incident radiation, resulting in a reference transmitted radiation; and analyzing a resultant radiation for a heterodyned spectrum, wherein the reference transmitted radiation becomes the sample incident radiation, and the sample reflected radiation becomes the resultant radiation.

In one or more embodiments disclosed herein, a system includes a processing chamber having a support for a sample etalon-object; a stage for a reference etalon-object; a radiation source; and a radiation detector, wherein: a first optical path is defined from the radiation source to the radiation detector, the support disposes the sample etalon-object in the first optical path, and the stage disposes the reference etalon-object in the first optical path.

In one or more embodiments disclosed herein, a method includes exposing a sample silicon wafer to a first incident radiation, resulting in a first transmitted radiation; exposing a reference silicon wafer to a second incident radiation, resulting in a second transmitted radiation, wherein the first transmitted radiation becomes the second incident radiation; and analyzing a resultant radiation for a heterodyned spectrum, wherein the second transmitted radiation becomes the resultant radiation, the analyzing comprising: measuring a fringe spacing between two adjacent interference patterns in the heterodyned spectrum; and utilizing the fringe spacing to estimate a refractive index of the sample etalon-object.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present invention generally relate to temperature measurements in semiconductor processing chambers and specifically to non-contact temperature measurements by heterodyning radiation between two etalon-objects within or associated with the processing chamber. In some embodiments, the two etalon-objects are semiconductor wafers (e.g., silicon wafers). In some embodiments, the two etalon-objects are at least partially transparent to radiation having a wavelength between about 1200 nm and about 1700 nm. In some embodiments, each of the two etalon-objects have substantially uniform physical thickness (no more than about 10% deviation). In some embodiments, the two etalon-objections are closely matched (between about 1% and about 10% difference) in physical thickness, optical thickness, index of refraction, and/or relative orientation.

One of the many potential advantages of the embodiments of the present disclosure is that in situ etalon-object (e.g., a substrate such as a semiconductor wafer) temperature measurements may be made over a broad temperature range (e.g., from about 20° C. to about 700° C.) with high resolution. Another potential advantage includes enabling direct temperature measurements without dependence on emissivity or heat transfer issues that can arise from substrate proximity methods. Temperature measurements disclosed herein may be minimally or unaffected by background or stray radiation. Another potential advantage includes allowing more accurate data for chamber design, testing, and/or maintenance. More accurate testing may be especially noticeable in systems having high background radiation, such as thermal annealing systems, and/or systems that use optical sources to heat etalon-objects. Another potential advantage includes providing increased temperature uniformity across an etalon-object during processing. For example, temperature measurements disclosed herein may be minimally or unaffected by emissivity variations of a sample etalon-object. Another potential advantage includes better chamber matching, and/or improved temperature control during processing. Embodiments of the present disclosure can thereby be useful in arenas of materials processing where tighter control of process temperature may enable advanced devices and/or high volume manufacturing.

Figure 1:
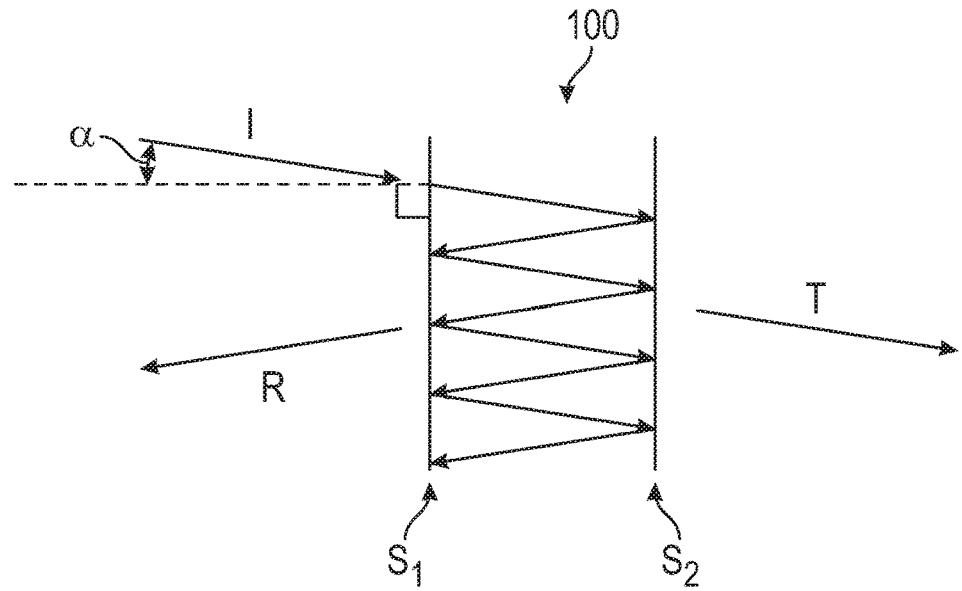
FIG. 1 illustrates an etalon and concepts related to etalons.

Relevant to techniques described herein, a substrate, such as a wafer, used in semiconductor processing is commonly made of silicon. Below 700° C., silicon semiconductor wafers are partially transparent to near-infrared radiation. The wafer may be shaped generally as a flat disk. The two flat surfaces of the disk (sometimes referred to as "front" and "back," "top" and "bottom", or "first" and "second") may be substantially parallel. In other words, the two surfaces of a wafer may form an etalon. As illustrated in FIG. 1, an etalon 100 is an optical element in which incident radiation I (e.g., infrared radiation) bounces back and forth between two surfaces $S_1$ and $S_2$. The incident radiation I may encounter the first surface $S_1$ at incidence angle $\alpha$. The radiation may exit the etalon 100 as transmitted radiation T and/or reflected radiation R. Because of a high refractive index of the silicon semiconductor wafer, there tends to be significant reflection between the two surfaces. With each reflection, there may be some loss of energy due to transmission. For the case of coherent radiation at a particular wavelength, the total transmitted power of the transmitted radiation T and the total reflected power of the reflected radiation R is a sensitive function of the optical thickness (the product of the refractive index and physical thickness) of the etalon 100. For example, transmitted power may be high for optical thicknesses corresponding to integer multiples of incident wavelength, and low for half-integer multiples of incident wavelength.

It should be appreciated that heterodyning techniques can be used in semiconductor processing with a variety of etalon-objects and materials. When the etalon-objects are silicon semiconductor wafers, a radiation source may be selected to produce coherent radiation over a broad wavelength spectrum from about 1100 nm to about 1700 nm. Other materials (e.g., gallium arsenide or germanium) and substrates (e.g., sapphire) may be used as etalon-objects in a semiconductor processing environment. In these cases, the wavelength range could be adjusted depending upon the transparency window of the particular objects and materials.

Figure 2:
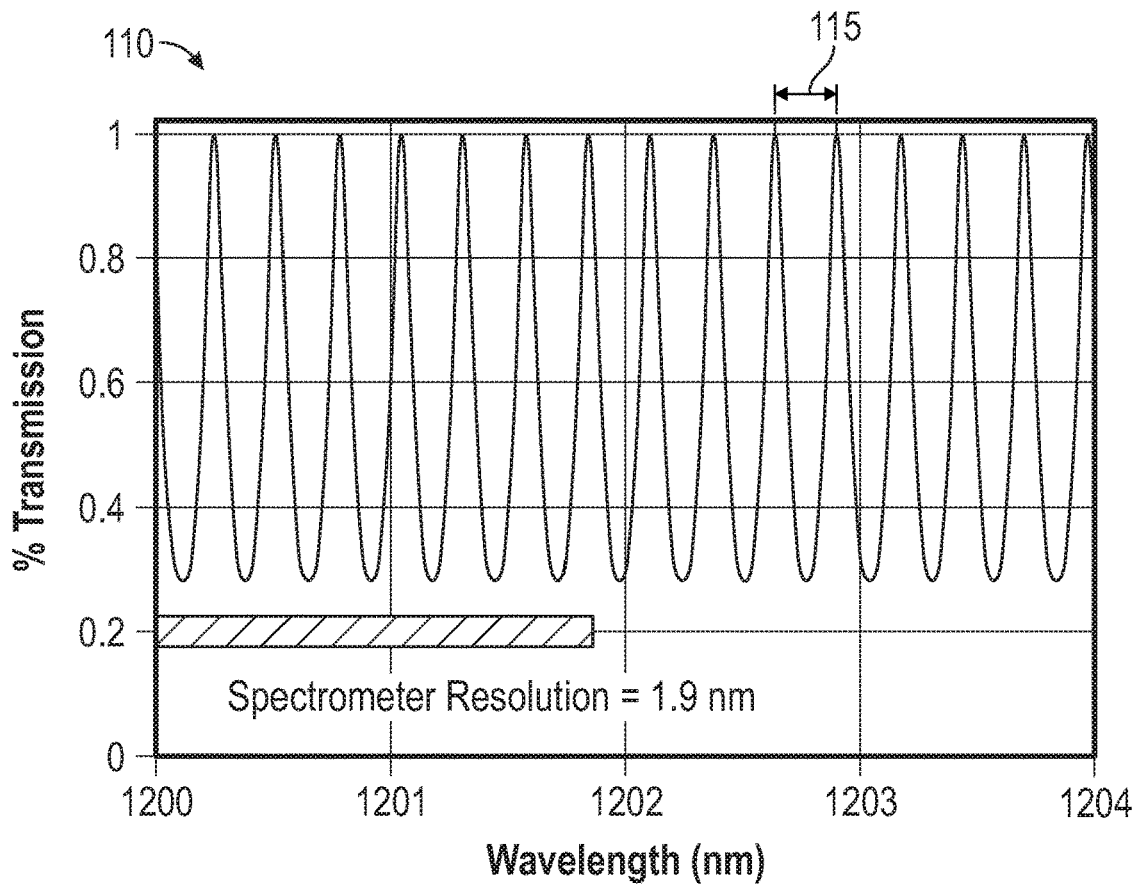
FIG. 2 illustrates a graph of transmission versus wavelength for standard-thickness silicon semiconductor wafers.

FIG. 2 illustrates a graph 110 of transmission versus wavelength for a standard-thickness (i.e., 0.775 mm) silicon wafer at room temperature with no absorption. It can be seen that reflections and transmissions interfere with each other constructively or destructively dependent on the wavelength and the optical thickness of the wafer. As illustrated, the fringe spacing 115 (e.g., distance between adjacent interference patterns, such as peaks or troughs) of 0.27 nm tends to be too narrow to be resolved by spectrometers typically incorporated into semiconductor tools. For example, one common spectrometer has a resolution of 1.9 nm.

Figure 3:
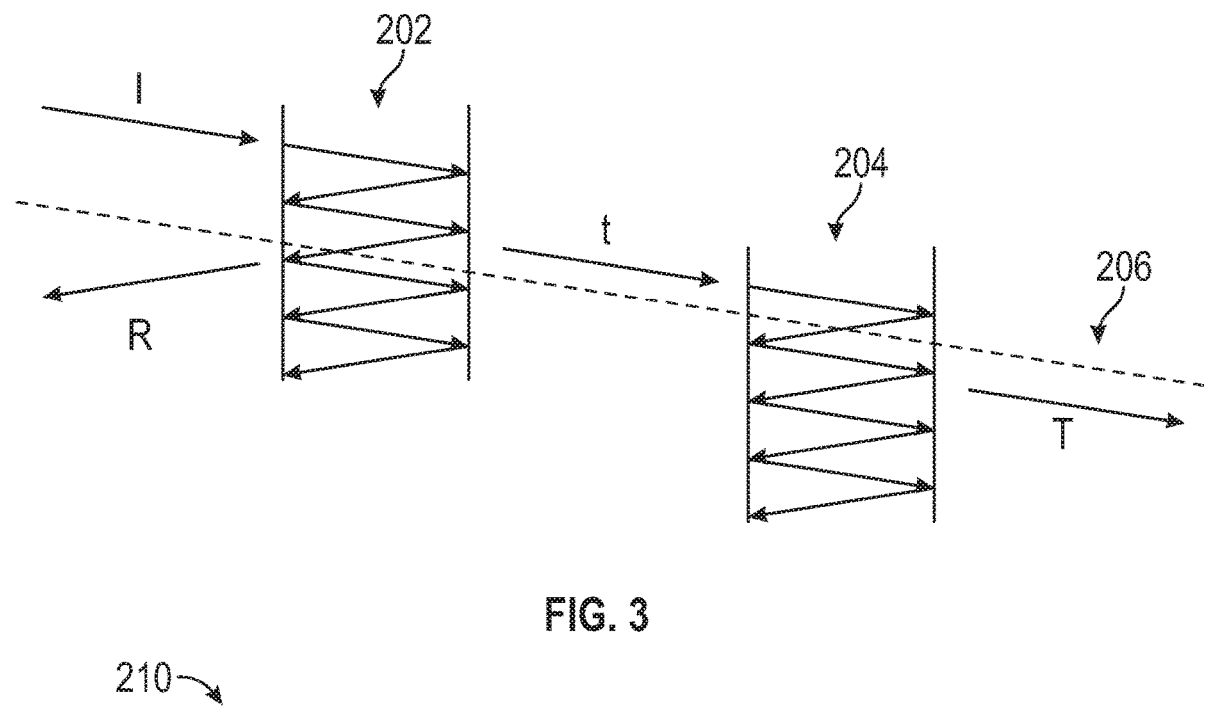
FIG. 3 illustrates a pair of etalon-objects aligned along an optical axis.

FIG. 3 illustrates a pair of etalon-objects 202 and 204 (e.g., silicon wafers) aligned along an optical axis 206. As illustrated, incident radiation/(e.g., infrared radiation) encounters etalon-object 202, bouncing between the two surfaces thereof, and emerges as transmitted radiation t. Transmitted radiation t becomes incident radiation for etalon-object 204, bouncing between the two surfaces thereof, and emerging as transmitted radiation T. As would be understood by one of ordinary skill in the art with the benefit of this disclosure, the radiation heterodynes (beats together) between the two etalons if the etalons are closely matched (between about 1% and about 10% difference). For example, the two etalons may be closely matched in refractive index, physical thickness, optical thickness, relative orientation, and/or incidence angle.

Figure 4:
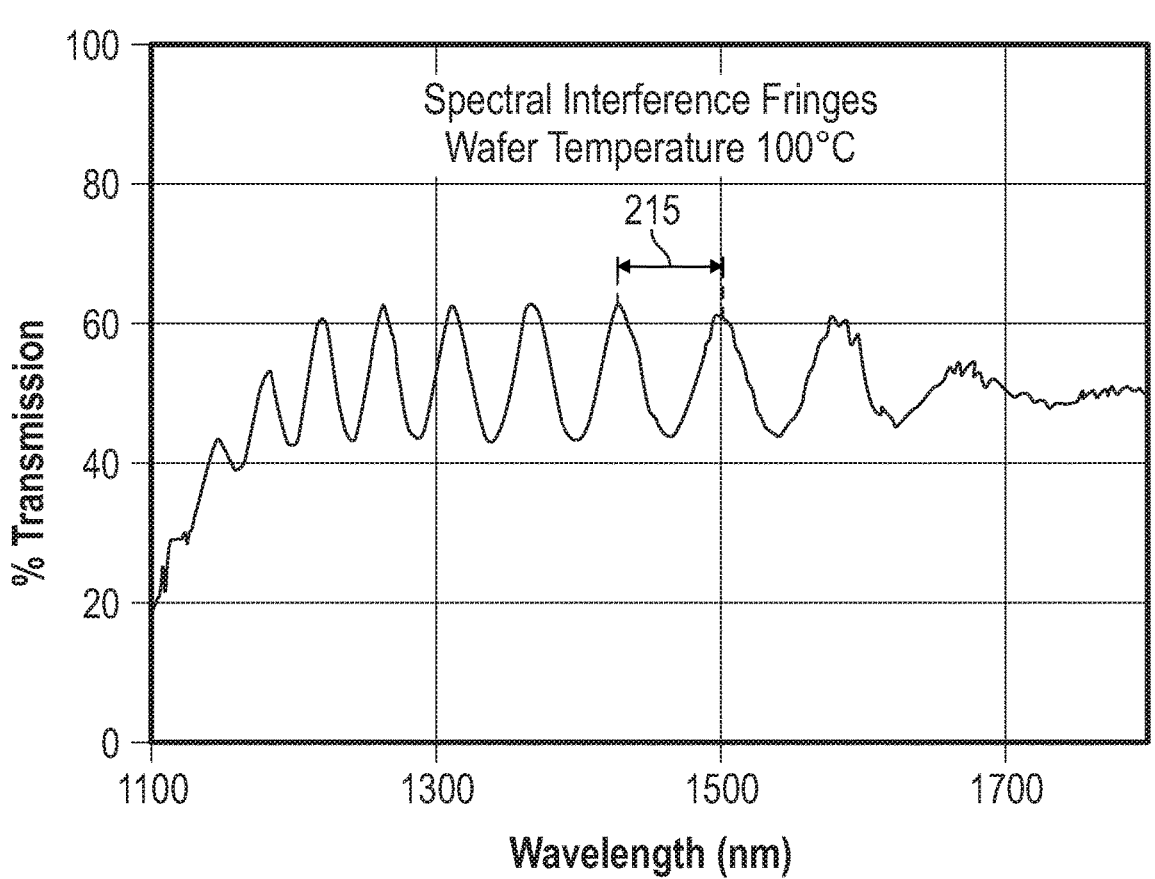
FIG. 4 illustrates another graph of transmission versus wavelength for a pair of standard-thickness silicon semiconductor wafers.

FIG. 4 illustrates a graph 210 of transmission versus wavelength for a pair of standard-thickness (i.e., 0.775 mm) silicon wafers. In FIG. 4, the reference wafer is maintained at 25° C. while the sample is at 100° C. The graph 210 illustrates a heterodyned spectrum having a fringe spacing generally much wider than the fringe spacing of graph 110. For example, the fringe spacing 215 between selected adjacent interference peaks (proximal wavelength=1500 nm) is approximately 80 nm. Note that, unlike graph 110, the fringe spacing in graph 210 varies by wavelength.

Figure 5:
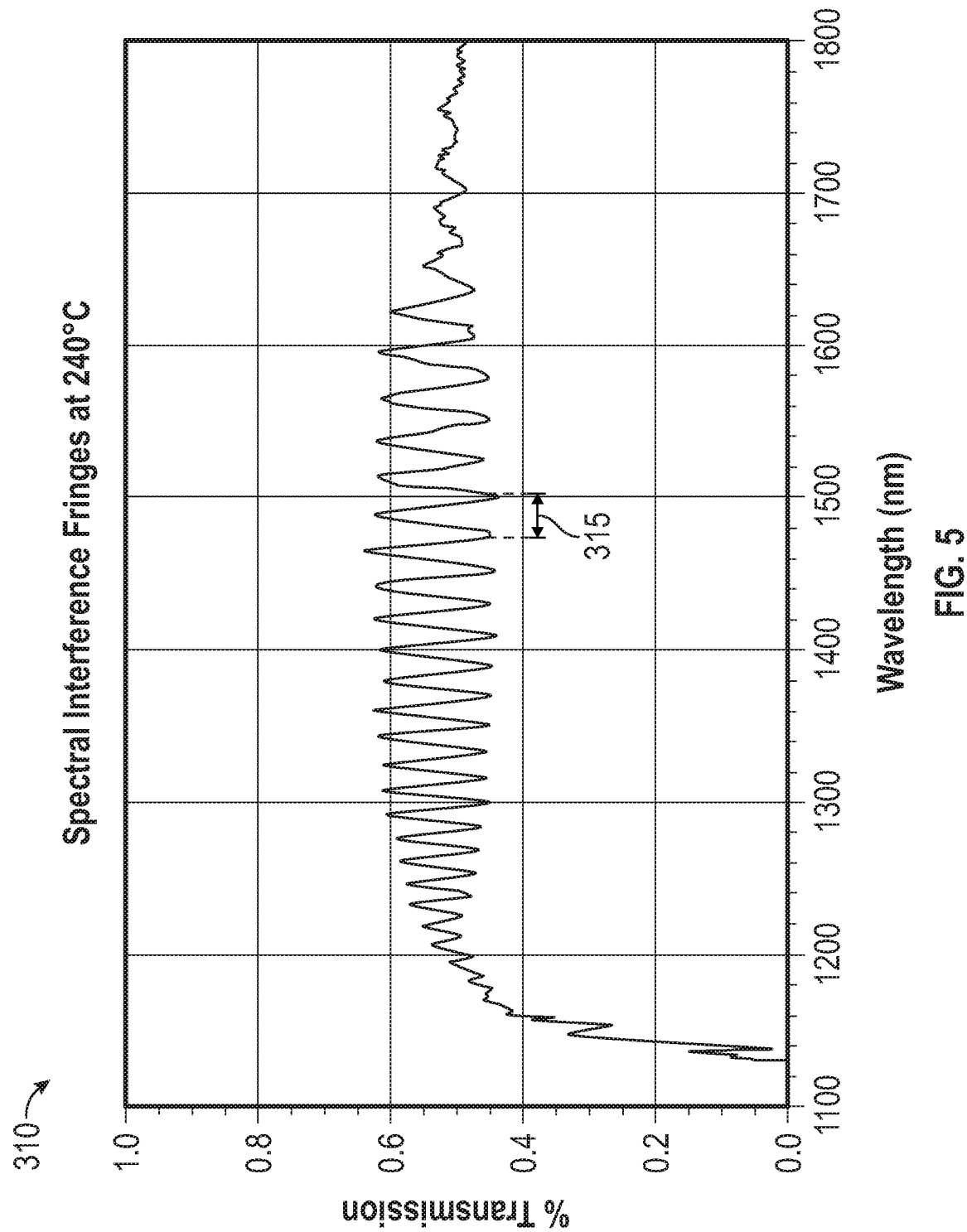
FIG. 5 illustrates another graph of transmission versus wavelength for a pair of standard-thickness silicon semiconductor wafers.

FIG. 5 illustrates another graph 310 of transmission versus wavelength for a pair of standard-thickness silicon wafers. In FIG. 5, the reference wafer is maintained at 25° C. while the sample is at 240° C. The graph 310 illustrates a heterodyned spectrum having a fringe spacing generally much wider than the fringe spacing of graph 110, but noticeably narrower than the fringe spacing of graph 210. For example, the fringe spacing 315 between selected adjacent interference troughs (proximal wavelength=1500 nm) is approximately 20 nm.

It should be appreciated that concepts and techniques related to fringe spacing may be similarly applicable to interference pattern period counting. For example, in FIG. 4, the interference pattern exhibits about 3.25 periods in the wavelength range between 1300 nm and 1500 nm. Due to the narrower fringe spacing in FIG. 5, over the same wavelength range, the interference pattern exhibits about 10 periods. Therefore, period counting may be substituted for fringe spacing. Period counting may be beneficial at various operational conditions (e.g., high sample temperatures).

Likewise, it should be appreciated that concepts and techniques related to fringe spacing may be similarly applicable to interference pattern phase changes. For example, in FIG. 4, the interference pattern exhibits a phase of about pi/2 at a wavelength of about 1400 nm. In FIG. 5, at the same wavelength, the interference pattern exhibits a phase of about −pi/2. By changing the temperature of the reference wafer gradually from 100° C., as in FIG. 4, to 240° C., as in FIG. 5, the phase of the interference pattern at the selected wavelength may be seen to progressively change. Therefore, phase changes with respect to temperature changes may be substituted for fringe spacing. Monitoring phase changes may be beneficial at various operational conditions (e.g., high sample temperatures). For example, substrate temperature may be substantially linearly related to the phase of the fringe pattern. This relationship may be established through the thermos-optic coefficient. In many cases, phase changes may be measured more accurately and/or efficiently than fringe spacing.

In some embodiments, the phase of the interference pattern may be monitored at a chosen wavelength (e.g., 1400 nm). Changes in phase at the chosen wavelength may be used to infer a change in temperature. For conditions of rapidly changing temperature, monitoring phase changes may improve the accuracy of temperature measurements. Monitoring phase changes may be done, in addition to, or in lieu of, measuring fringe spacing and/or phase changes.

As previously discussed, heterodyning occurs when the etalons are closely matched. For substantially parallel etalons having substantially the same physical thickness, heterodyning occurs when the etalons are closely matched (between about 1% and about 10% difference) in refractive index. The refractive index of typical etalon-objects (e.g., silicon wafers) associated with processing chambers varies with temperature. Consequently, for substantially parallel etalon-objects having substantially the same physical thickness, the extent of heterodyning (as indicated by the fringe spacing) varies with temperature. One of the etalon-objects, referred to as the "reference" etalon-object, may be maintained at a reference temperature. The other etalon-object may be referred to as the "sample" etalon-object. Thus, the fringe spacing can be used to calculate a difference in refractive index between the reference etalon-object and the sample etalon-object. The refractive index can then be used to infer the temperature of the sample etalon-object. It should be appreciated that known variations in relative incidence angle and/or physical thickness between the reference etalon-object and the sample etalon-object may be incorporated into the calculation of the refractive index and/or inferred temperature of the sample etalon-object.

In some embodiments, the reference etalon may be made of a different material than the sample etalon-object. In some embodiments, the reference etalon object may be made of a material having a refractive index that does not vary significantly with temperature. In such embodiments, the refractive index of the reference etalon-object may be known and/or estimated without specifically maintaining the reference temperature.

Figure 6:
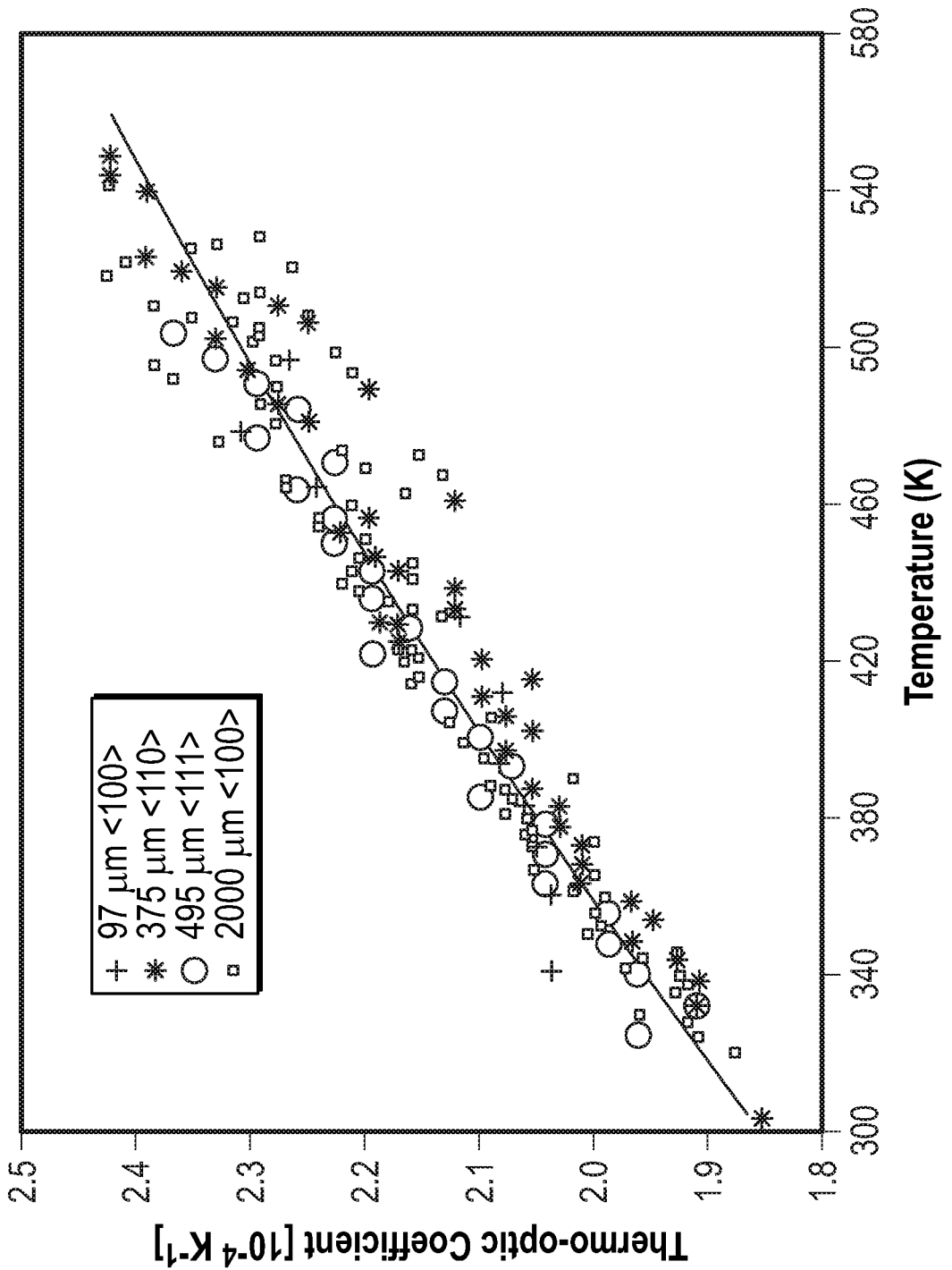
FIG. 6 illustrates a graph of thermo-optic coefficient versus temperature for a silicon semiconductor wafer from room temperature to about 300° C.

In some embodiments, the relationship between refractive index and temperature may be estimated or modeled. In some embodiments, the relationship between refractive index and temperature may be obtained through calibration. In some embodiments, a graph of thermo-optic coefficient (i.e., the change in refractive index versus temperature, dn/dT) may be used to estimate refractive index for a given temperature range. FIG. 6 illustrates a graph of thermo-optic coefficient versus temperature for a silicon semiconductor wafer from room temperature to about 300° C. Note that the refractive index on the vertical axis of FIG. 6 changes gradually with large temperature changes along the horizontal axis.

Figure 7:
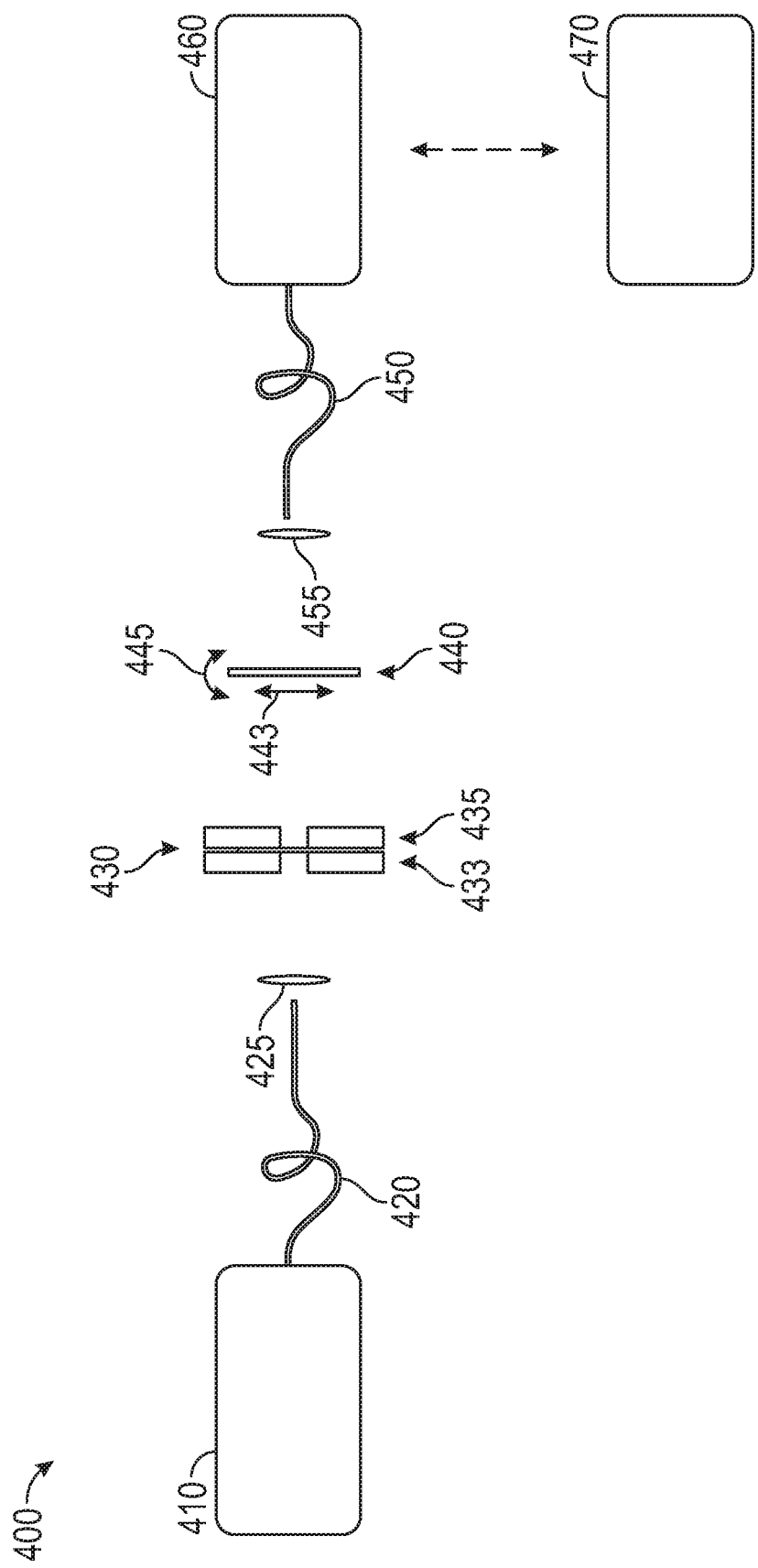
FIG. 7 illustrates an example configuration for making temperature measurements with etalons.

One example configuration 400 for making temperature measurements with etalons is illustrated in FIG. 7. Configuration 400 allows for temperature measurement of a sample etalon-object by inducing heterodyning between the sample etalon-object and a reference etalon-object and analyzing radiation that has encountered the sample etalon-object. As illustrated, source radiation is generated at radiation source 410. For example, radiation source 410 may be a coherent radiation source, such as a supercontinuum laser. As another example, radiation source 410 may be a Super Luminescent Diode or a grouping thereof. In some embodiments, radiation source 410 may produce radiation having a wavelength band of between about 400 nm and about 2500 nm. In some embodiments, radiation source 410 may produce coherent radiation over a broad spectrum, such as from about 1100 nm to about 1700 nm.

In configuration 400, radiation from radiation source 410 travels along an optical path, such as through optical waveguide 420. The optical waveguide 420 may be a fiber optic cable, allowing for adaptation of the test configuration to existing chamber designs. In some embodiments, the optical path is direct, and the optical waveguide 420 may be omitted. The optical waveguide 420 may have collimating optics 425 at the end opposite radiation source 410. For example, collimating optics 425 may be a lens that directs radiation towards and/or focuses radiation on a particular spatial location opposite the optical waveguide 420.

In configuration 400, the optical waveguide 420 and/or collimating optics 425 direct radiation at a first etalon-object 430. Radiation may bounce between the surfaces of first etalon-object 430, with at least a portion of the radiation transmitted through first etalon-object 430 and conveyed towards second etalon-object 440. The conveyed radiation may bounce between the surfaces of second etalon-object 440, with at least a portion of the radiation transmitted through second etalon-object 440. Radiation transmitted through both first etalon-object 430 and second etalon-object 440 may heterodyne, as evidenced by the spectral properties of the twice-transmitted radiation. In some embodiments, first etalon-object 430 serves as a reference etalon-object, while second etalon-object 440 serves as a sample etalon-object. In other embodiments, first etalon-object 430 serves as a sample etalon-object, and reference etalon-object 440 serves as a reference etalon-object. In the illustrated embodiment, second etalon-object 440 serves as the reference etalon-object. As such, second etalon-object 440 is configured to move translationally 443 and/or rotationally 445 with respect to the first etalon-object 430. For example, second etalon-object 440 may be disposed on a translation and/or rotation stage to control the movement.

In configuration 400, radiation transmitted through first etalon-object 430 and/or second etalon-object 440 travels along an optical path, such as through optical waveguide 450. The optical waveguide 450 may be a fiber optic cable, allowing for adaptation of configuration 400 to existing chamber designs. In some embodiments, the optical path is direct, and the optical waveguide 450 may be omitted. The optical waveguide 450 may have collecting optics 455 at the end nearest the first etalon-object 430 and/or second etalon-object 440. For example, collecting optics 455 may be a lens that collects radiation from the first etalon-object 430 and/or second etalon-object 440 and directs the radiation towards and/or focuses the radiation on the optical waveguide 450.

In configuration 400, the optical waveguide 450 directs the transmitted radiation to a radiation measurement device 460. For example, the radiation measurement device 460 may be a spectrometer, such as an indium gallium arsenide (InGaAs) array spectrometer. The radiation measurement device 460 may be configured to detect radiation having a wavelength band of between about 850 nm and about 1700 nm. In some embodiments, the radiation source 410 and radiation measurement device 460 are selected so that the radiation source 410 emits over a majority (e.g., at least 40%) of the measurement spectrum of the radiation measurement device 460. It may be beneficial to select a supercontinuum laser for radiation source 410 to provide radiation over the majority of the detection spectrum of radiation measurement device 460. The radiation measurement device 460 may be capable of measuring heterodyned periods of the radiation.

In some embodiments, the configuration 400 includes a spectral analyzer 470. The spectral analyzer 470 may be capable of receiving data from the radiation measurement device 460. The spectral analyzer 470 may receive, process, store, and/or analyze data from one or more elements of configuration 400 to identify spectral interference fringe spacing, such as fringe spacing 215 in FIG. 4 and/or fringe spacing 315 in FIG. 5, to compute an optical thickness of the sample etalon-object, and/or to infer a temperature measurement of the sample etalon-object. In some embodiments, the data from the radiation measurement device 460 may be used to generate plots, such as graph 210 in FIG. 4, for further analysis.

In some embodiments, the reference etalon-object (second etalon-object 440 in FIG. 7) is disposed outside of a processing chamber to better control the reference temperature. In such embodiments, the sample etalon-object (first etalon-object 430 in FIG. 7) is disposed inside of the processing chamber. In some embodiments, the sample etalon-object is heated. For example, annular plate heaters 433 and 435 may be disposed on one or both sides of the sample etalon-object. Annular plate heaters 433 and 435 may each have an aperture (e.g., transparent port) to allow the radiation to travel from the optical waveguide 420 to the sample etalon-object, and to allow the radiation to travel from the sample etalon-object to the reference etalon-object. When annular plate heaters are disposed on both sides of sample etalon-object, as illustrated, the aperture of plate heater 433 may be aligned with the aperture of plate heater 435 to provide a direct optical path. In some embodiments, each of the apertures may be a 4 mm hole disposed at the center of the annular heater. In some embodiments, the reference etalon-object (second etalon-object 440 in FIG. 7) is made of fused silica. It may be beneficial to have a reference etalon-object of fused silica to provide a lower thermos-optic coefficient, less temperature drift, and larger change in optical thickness with rotation in comparison to a standard silicon semiconductor wafer.

In some embodiments, heterodyned radiation between a pair of etalons may be utilized to make temperature measurements of etalon-objects in a semiconductor processing chamber, for example, in situ temperature measurements of a silicon semiconductor wafer. Temperature measurements with etalons may be minimally or insensitive to background radiation and/or surface emissivity. Temperature measurements with etalons may be minimally or unaffected by plasma and/or microwave environments. Temperature measurements with etalons may be independent of absolute detector calibration and/or absolute photocurrent. Temperature measurements with etalons may be superior to those made by thermocouples. Thermocouples may be limited by heat transfer issues, indirect measurement inaccuracies, and/or induced electrical noise. Temperature measurements made using etalons to induce heterodyned radiation may be beneficial in systems with large background radiation, such as thermal annealing systems that use optical sources to heat wafers.

Figure 8:
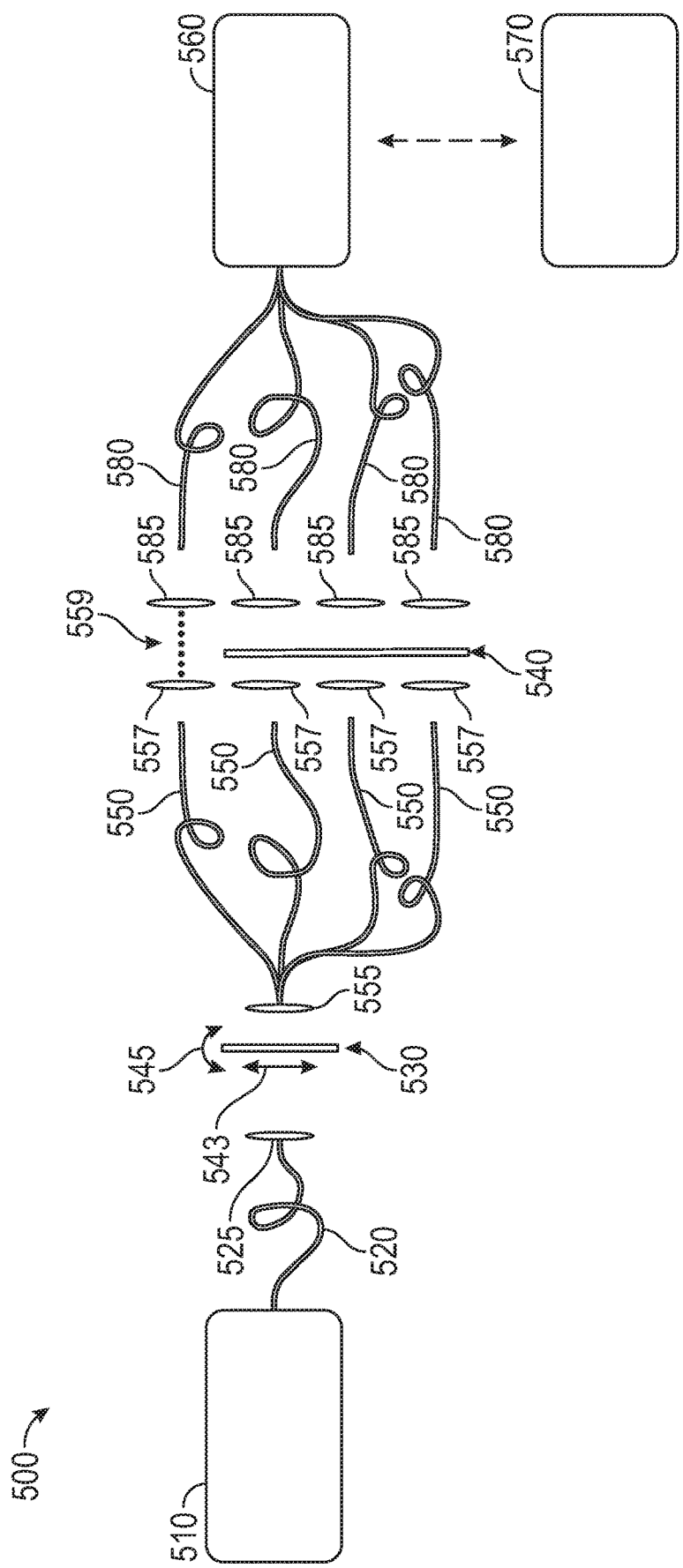
FIG. 8 illustrates another example configuration for making temperature measurements with etalons.

FIG. 8 illustrates another example configuration 500 for making temperature measurements with etalon-objects. As before, source radiation is generated at radiation source 510. Radiation source 510 may be a coherent radiation source, such as a supercontinuum laser. Radiation from radiation source 510 travels along an optical path, either directly or through optical waveguide 520. Optical waveguide 520 may be a fiber optic cable. The optical waveguide 520 may have collimating optics 525 at the end opposite radiation source 510. The optical waveguide 520 and/or collimating optics 525 direct radiation at a first etalon-object 530. Radiation may bounce between the surfaces of first etalon-object 530, with at least a portion of the radiation transmitted through first etalon-object 530.

In configuration 500, radiation transmitted through first etalon-object 530 travels along one or more optical paths, such as through optical waveguides 550. The optical waveguides 550 may be one or more fiber optic cables, allowing for adaptation of configuration 500 to existing chamber designs. In some embodiments, the optical length of each of the optical waveguides 550 is substantially the same. In some embodiments, the optical lengths of the various optical waveguides 550 are selected so that the phase of the radiation exiting each of the optical waveguides 550 exhibits selected properties. The optical waveguides 550 may have collimating optics 555 at the end nearest the first etalon-object 530. In some embodiments, configuration 500 may include one or more selection devices (e.g., switches, optical choppers, or multi-beam splitters) capable of selecting between the optical waveguides 550. The selection device may sequentially select one or more of the optical waveguides 550 for conveying radiation.

In configuration 500, optical waveguides 550 convey radiation towards second etalon-object 540. The optical waveguides 550 may have collimating optics 557 at the end nearest second etalon-object 540. The conveyed radiation may bounce between the surfaces of second etalon-object 540, with at least a portion of such radiation transmitted through second etalon-object 540. Radiation transmitted through both first etalon-object 530 and second etalon-object 540 may heterodyne, as evidenced by the spectral properties of the twice-transmitted radiation. In some embodiments, first etalon-object 530 serves as a reference etalon-object, while second etalon-object 540 serves as a sample etalon-object. In other embodiments, first etalon-object 530 serves as a sample etalon-object, and reference etalon-object 540 serves as a reference etalon-object. In the illustrated embodiment, first etalon-object 530 serves as the reference etalon-object. As such, first etalon-object 530 is configured to move translationally 543 and/or rotationally 545 with respect to the second etalon-object 540. For example, first etalon-object 530 may be disposed on a translation and/or rotation stage to control the movement.

In configuration 500, radiation transmitted through first etalon-object 530 and/or second etalon-object 540 travels along one or more transmission optical paths, such as through optical waveguides 580. The optical waveguides 580 may be one or more fiber optic cables, allowing for adaptation of configuration 500 to existing chamber designs. In some embodiments, the optical length of each of the optical waveguides 580 is substantially the same. In some embodiments, the optical lengths of the various optical waveguides 580 are selected so that the phase of the radiation exiting each of the optical waveguides 580 exhibits selected properties. The optical waveguides 580 may have collecting optics 585 at the end nearest the second etalon-object 540.

In configuration 500, one or more of the optical paths between first etalon-object 530 and second etalon-object 540 may align with the transmission optical paths. In some embodiments, or at certain times during a given embodiment, only a subset of the optical paths encounter (i.e., incident upon and transmitted through and/or reflected from) the second etalon-object 540. For example, optical path 559 does not encounter second etalon-object 540. As would be understood by one of ordinary skill in the art with the benefit of this disclosure, radiation along optical path 559 will not exhibit heterodyned spectral properties. Detection and measurement of radiation from optical path 559 may assist with calibration, quality control, and/or other operational performance assessments.

In configuration 500, the optical waveguides 580 direct the transmitted radiation to a radiation measurement device 560. For example, the radiation measurement device 560 may be a spectrometer or an array of spectrometers. The radiation measurement device 560 may be capable of measuring heterodyned periods of the radiation. The radiation measurement device 560 may be capable of separately detecting, identifying, and/or measuring radiation from the one or more optical waveguides 580. For example, radiation measurement device 560 may include one or more selection devices (e.g., switches, optical choppers, or multi-beam splitters) capable of selecting between the optical waveguides 580. The radiation measurement device 560 may sequentially select one or more of the optical waveguides 580 for measurement.

In some embodiments, the configuration 500 includes a spectral analyzer 570. The spectral analyzer 570 may be capable of receiving data from the radiation measurement device 560. In some embodiments, the spectral analyzer 570 may be capable of separately identifying and/or analyzing spectral data from the one or more optical waveguides 580. The spectral analyzer 570 may receive, process, store, and/or analyze data from one or more elements of configuration 500 to identify spectral interference fringe spacing, such as fringe spacing 215 in FIG. 4 and/or fringe spacing 315 in FIG. 5, to compute one or more optical thicknesses of the sample etalon-object, and/or to infer one or more temperature measurements of the sample etalon-object. For example, each optical path may be collimated to encounter a portion of the sample etalon-object, and data from each optical path may be representative of optical thickness, index of refraction, and/or temperature at the respective portion of the sample etalon-object.

Figure 9:
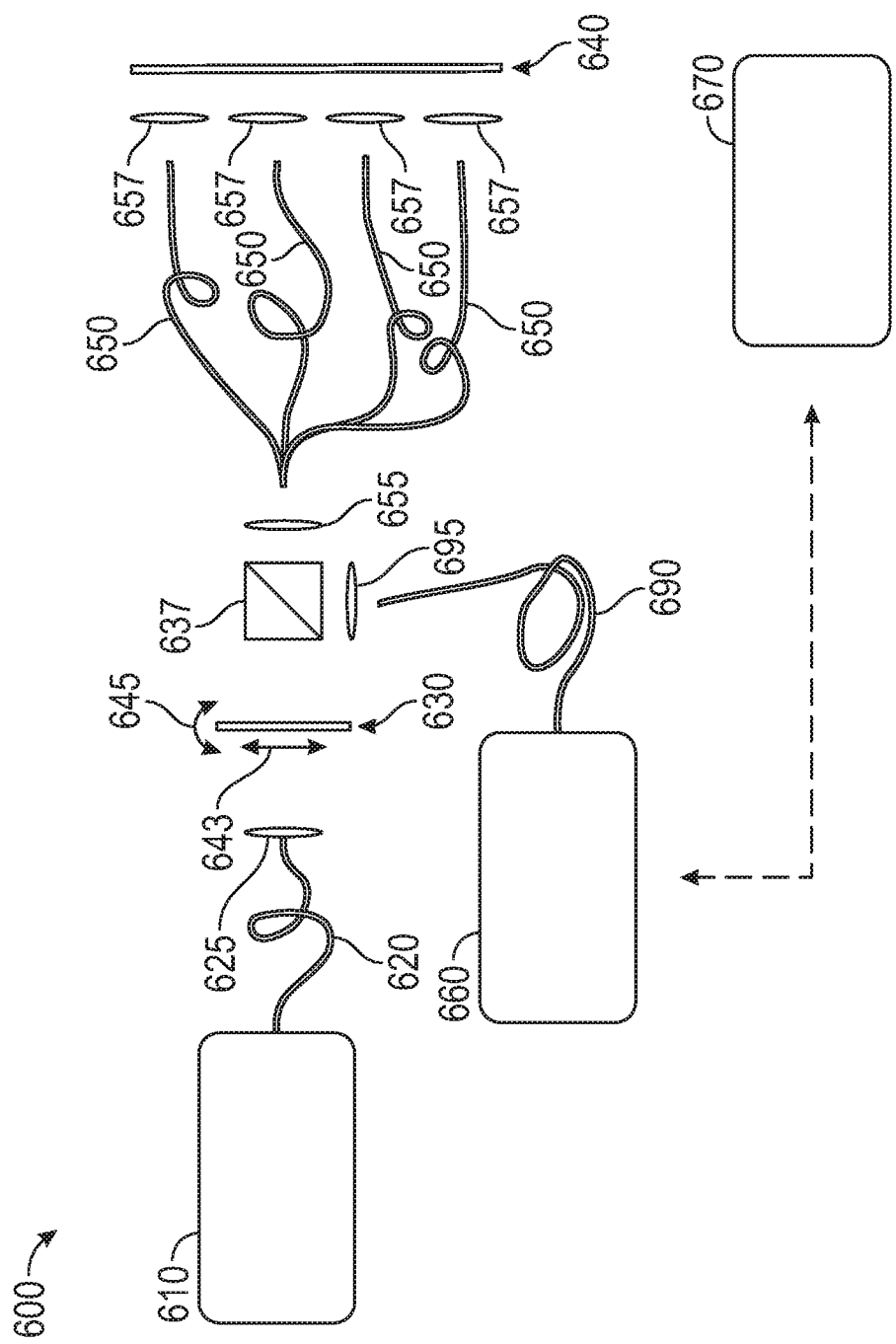
FIG. 9 illustrates another example configuration for making temperature measurements with etalons.

As should be appreciated with the benefit of this disclosure, the above configurations could be reconfigured to work in a reflection mode. This may be advantageous for measuring temperature of etalon-objects (e.g., film stacks) that are either non-transmissive or oriented in a way that makes access to transmitted radiation difficult. FIG. 9 illustrates an example configuration 600 for making temperature measurements with etalon-objects in a reflection mode. As before, source radiation is generated at radiation source 610. Radiation source 610 may be a coherent radiation source, such as a supercontinuum laser. Radiation from radiation source 610 travels along an optical path, either directly or through optical waveguide 620. Optical waveguide 620 may be a fiber optic cable. The optical waveguide 620 may have collimating optics 625 at the end opposite radiation source 610. The optical waveguide 620 and/or collimating optics 625 direct radiation at a first etalon-object 630. Radiation may bounce between the surfaces of first etalon-object 630, with at least a portion of the radiation transmitted through first etalon-object 630.

In configuration 600, radiation is transmitted through first etalon-object 630 and is incident upon a beam splitter 637 (e.g., a partial mirror or a pulse splitter). Beam splitter 637 may be configured to transmit a first portion of the incident radiation and to redirect (e.g., by 90 degrees) a second portion of the incident radiation. The second portion of the incident radiation will be referred to as the initial redirected radiation. The transmitted portion travels along one or more optical paths, such as through optical waveguides 650. The optical waveguides 650 may be one or more fiber optic cables, allowing for adaptation of configuration 600 to existing chamber designs. In some embodiments, the optical length of each of the optical waveguides 650 is substantially the same. In some embodiments, the optical lengths of the various optical waveguides 650 are selected so that the phase of the radiation exiting each of the optical waveguides 650 exhibits selected properties. The optical waveguides 650 may have collimating optics 655 at the end nearest the first etalon-object 630.

In configuration 600, optical waveguides 650 convey radiation towards second etalon-object 640. The optical waveguides 650 may have collimating optics 657 at the end nearest second etalon-object 640. The conveyed radiation may bounce between the surfaces of second etalon-object 640, with at least a portion of such radiation reflected back from second etalon-object 640. Radiation transmitted through first etalon-object 630 and reflected from second etalon-object 640 may heterodyne, as evidenced by the spectral properties of the transmitted-reflected radiation. It should be appreciated that transmitted-reflected heterodyne spectra may exhibit a phase-shift in comparison to twice-transmitted heterodyne spectra. In some embodiments, first etalon-object 630 serves as a reference etalon-object, while second etalon-object 640 serves as a sample etalon-object. In other embodiments, first etalon-object 630 serves as a sample etalon-object, and reference etalon-object 640 serves as a reference etalon-object. In the illustrated embodiment, first etalon-object 630 serves as the reference etalon-object. As such, first etalon-object 630 is configured to move translationally 643 and/or rotationally 645 with respect to the second etalon-object 640. For example, first etalon-object 630 may be disposed on a translation and/or rotation stage to control the movement.

In configuration 600, radiation transmitted through first etalon-object 630 and reflected from second etalon-object 640 travels along one or more transmission optical paths, such as through optical waveguides 650. The radiation may then be directed towards beam splitter 637. In some embodiments, the radiation may travel from optical waveguides 650 and through collimating optics 655 towards beam splitter 637. Beam splitter 637 may be configured to redirect (e.g., by 90 degrees) at least a portion of the transmitted-reflected radiation. The redirected portion of the transmitted-reflected radiation shall be referred to as the secondary redirected radiation. The secondary redirected radiation may be coextensive with, and/or axially aligned with, the initial redirected radiation. The initial redirected radiation and/or the secondary redirected radiation travels along an optical path, such as through optical waveguides 690. The optical waveguides 690 may be a fiber optic cable, allowing for adaptation of configuration 600 to existing chamber designs. The optical waveguide 690 may have collimating optics 695 at the end nearest the beam splitter 637. As would be understood by one of ordinary skill in the art with the benefit of this disclosure, the initial redirected radiation will not exhibit heterodyned spectral properties.

In configuration 600, the optical waveguide 690 directs the initial redirected and/or the secondary redirected radiation to a radiation measurement device 660. For example, the radiation measurement device 660 may be a spectrometer or an array of spectrometers. The radiation measurement device 660 may be capable of measuring heterodyned periods of the radiation. The radiation measurement device 660 may be capable of separately detecting, identifying, and/or measuring radiation from the one or more optical waveguides 650.

In some embodiments, the configuration 600 includes a spectral analyzer 670. The spectral analyzer 670 may be capable of receiving data from the radiation measurement device 660. In some embodiments, the spectral analyzer 670 may be capable of separately identifying and/or analyzing spectral data from the one or more optical waveguides 650. The spectral analyzer 670 may receive, process, store, and/or analyze data from one or more elements of configuration 600 to identify spectral interference fringe spacing, such as fringe spacing 215 in FIG. 4 and/or fringe spacing 315 in FIG. 5, to compute one or more optical thicknesses of the sample etalon-object, and/or to infer one or more temperature measurements of the sample etalon-object. For example, each optical path may be collimated to encounter a portion of the sample etalon-object, and data from each optical path may be representative of optical thickness, index of refraction, and/or temperature at the respective portion of the sample etalon-object.

While aspects herein are described with respect to semiconductor wafers such as silicon wafers, it is contemplated that other substrates, including those formed of other materials, may benefit from aspects of the disclosure.

Benefits of the present disclosure include the ability to measure temperatures of objects in a chamber over a broader range (e.g., from about 20° C. to about 700° C.) with high resolution. Benefits also include the ability to make direct temperature measurements, without dependence on emissivity, heat transfer issues associated with proximity measurements, or background radiation due to optical, microwave, or radio frequency fields.

In one or more embodiments disclosed herein, a method includes exposing a sample etalon-object to a sample incident radiation, resulting in a sample transmitted radiation, wherein the sample etalon-object is disposed in a processing chamber; exposing a reference etalon-object to a reference incident radiation, resulting in a reference transmitted radiation; and analyzing a resultant radiation for a heterodyned spectrum, wherein the sample transmitted radiation becomes the reference incident radiation, and the reference transmitted radiation becomes the resultant radiation.

In one or more embodiments disclosed herein, a method includes exposing a sample etalon-object to a sample incident radiation, resulting in a sample transmitted radiation, wherein the sample etalon-object is disposed in a processing chamber; exposing a reference etalon-object to a reference incident radiation, resulting in a reference transmitted radiation; and analyzing a resultant radiation for a heterodyned spectrum, wherein the reference transmitted radiation becomes the sample incident radiation, and the sample transmitted radiation becomes the resultant radiation.

In one or more embodiments disclosed herein, a method includes exposing a sample etalon-object to a sample incident radiation, resulting in a sample transmitted radiation, wherein the sample etalon-object is disposed in a processing chamber; exposing a reference etalon-object to a reference incident radiation, resulting in a reference reflected radiation; and analyzing a resultant radiation for a heterodyned spectrum, wherein the sample transmitted radiation becomes the reference incident radiation, and the reference reflected radiation becomes the resultant radiation.

In one or more embodiments disclosed herein, a method includes exposing a sample etalon-object to a sample incident radiation, resulting in a sample reflected radiation, wherein the sample etalon-object is disposed in a processing chamber; exposing a reference etalon-object to a reference incident radiation, resulting in a reference transmitted radiation; and analyzing a resultant radiation for a heterodyned spectrum, wherein the reference transmitted radiation becomes the sample incident radiation, and the sample reflected radiation becomes the resultant radiation.

In one or more embodiments disclosed herein, the method further includes, based on the analyzing the resultant radiation for a heterodyned spectrum, inferring a temperature of the sample etalon-object.

In one or more embodiments disclosed herein, the analyzing the resultant radiation for a heterodyned spectrum includes measuring a fringe spacing between two adjacent interference patterns in the heterodyned spectrum; and utilizing the fringe spacing to estimate a refractive index of the sample etalon-object.

While the foregoing is directed to examples of the present disclosure, other and further examples of the disclosure may be devised without departing from the basic scope thereof, and the scope thereof is determined by the claims that follow.

What is claimed is:

1. A method comprising:
exposing a sample etalon-object to a sample incident radiation, resulting in a sample transmitted radiation, wherein the sample etalon-object is disposed in a processing chamber;
exposing a reference etalon-object to a reference incident radiation, resulting in a reference transmitted radiation, wherein each of the etalon-objects comprises a semiconductor substrate; and analyzing, with a spectral analyzer, a resultant radiation for a heterodyned spectrum, wherein the sample transmitted radiation becomes the reference incident radiation, and the reference transmitted radiation becomes the resultant radiation.

2. The method of claim 1, wherein the reference etalon-object is disposed in the processing chamber.

3. The method of claim 1, wherein the etalon-objects are closely matched in at least one of physical thickness, optical thickness, index of refraction, and relative orientation.

4. The method of claim 1, wherein, the etalon-objects are at least partially transparent to radiation in a wavelength range between 1200 nm and 1700 nm at temperatures between 20° C. and 700° C.

5. The method of claim 1, further comprising providing a source radiation, wherein the source radiation becomes at least one of the sample incident radiation and the reference incident radiation, and wherein the source radiation comprises coherent radiation over a broad spectrum of wavelengths.

6. The method of claim 5, wherein the source radiation is provided with a supercontinuum laser.

7. The method of claim 6, wherein the broad spectrum of wavelengths is between 1100 nm and 1700 nm.

8. The method of claim 6, wherein analyzing the resultant radiation comprises detecting a resultant spectrum, and the broad spectrum of wavelengths comprises at least 40% of the resultant spectrum.

9. The method of claim 1, wherein analyzing the resultant radiation comprises detecting a resultant spectrum having a wavelength band of between 850 nm and 1700 nm.

10. The method of claim 1, further comprising heating the sample etalon-object.

11. The method of claim 1, further comprising maintaining the reference etalon-object at a reference temperature.

12. The method of claim 1, further comprising, based on the analyzing the resultant radiation for the heterodyned spectrum, inferring a temperature of the sample etalon-object.

13. The method of claim 12, wherein the analyzing the resultant radiation for the heterodyned spectrum comprises:
    measuring a phase of a fringe pattern in the heterodyned spectrum; and
    utilizing the phase of the fringe pattern to estimate a refractive index of the sample etalon-object.

14. A system comprising:
    a processing chamber having a support for a sample etalon-object;
    a stage for a reference etalon-object, wherein each of the etalon-objects comprises a semiconductor substrate;
    a radiation source; and
    a radiation detector, wherein:
        a first optical path is defined from the radiation source to the radiation detector,
        the support disposes the sample etalon-object in the first optical path, and
        the stage disposes the reference etalon-object in the first optical path.

15. The system of claim 14, wherein the first optical path at least partly comprises a fiber optic cable.

16. The system of claim 14, further comprising a beam splitter disposed in the first optical path.

17. The system of claim 14, wherein the stage is inside the processing chamber.

18. The system of claim 14, wherein the radiation source provides radiation having a broad spectrum of wavelengths between 1100 nm and 1700 nm, and the radiation detector is configured to detect a resultant spectrum having a wavelength band of between 850 nm and 1700 nm.

19. A method comprising:
    exposing a sample silicon wafer to a first incident radiation, resulting in a first transmitted radiation, wherein the sample silicon wafer comprises a sample etalon-object;
    exposing a reference silicon wafer to a second incident radiation, resulting in a second transmitted radiation, wherein the first transmitted radiation becomes the second incident radiation, wherein the reference silicon wafer comprises a reference etalon-object; and
    analyzing, with a spectral analyzer, a resultant radiation for a heterodyned spectrum, wherein the second transmitted radiation becomes the resultant radiation, the analyzing comprising:
        measuring a fringe spacing between two adjacent interference patterns in the heterodyned spectrum; and
        utilizing the fringe spacing to estimate a refractive index of the sample silicon wafer.

* * * * *